(12) United States Patent  
Athanasiou

(10) Patent No.: US 7,628,258 B2  
(45) Date of Patent: Dec. 8, 2009

(54) STEERING DAMPER

(76) Inventor: George John Athanasiou, 2499 S. Stockton St., #3, Lodi, CA (US) 95240

( * ) Notice: Subject to any disclaimer, the term of this patent is extended or adjusted under 35 U.S.C. 154(b) by 0 days.

(21) Appl. No.: 11/112,189

(22) Filed: Apr. 22, 2005

(65) Prior Publication Data

US 2006/0237271 A1    Oct. 26, 2006

(51) Int. Cl.  
*F16D 57/02* (2006.01)

(52) U.S. Cl. .................. 188/296; 188/313; 188/316

(58) Field of Classification Search ......... 188/290, 188/293, 294, 296, 306, 309, 310, 313, 314, 188/316; 192/58.1; 280/272  
See application file for complete search history.

(56) References Cited

U.S. PATENT DOCUMENTS 5,492,033 A * 2/1996 Hopey ................. 74/551.1  
5,516,133 A * 5/1996 Motrenec et al. ......... 280/272  
5,836,213 A * 11/1998 Hopey ................. 74/551.2  
6,213,881 B1 * 4/2001 Sasa et al. .............. 464/24  
6,824,153 B2 * 11/2004 Hanawa et al. .......... 280/272

* cited by examiner

*Primary Examiner*—Xuan Lan Nguyen

(57) ABSTRACT

A four chamber hydraulic steering damper where a two sided rotary vane moves working fluid from one side of each vane to the adjacent side of the same vane when rotated in synchronism with the steering mechanism. The working fluid is directed through narrow passageways that may be metered and/or valved. Each chamber may have a unique or similar pressure relief area creating varying dampening through the steering rotation. The damper may be affixed to the steering shaft directly or by linkage to the steering shaft or another moving component of the steering assembly.

1 Claim, 4 Drawing Sheets

STEERING DAMPER

BACKGROUND OF THE INVENTION

1. Field of the Invention

This invention relates to tunable zones of steering rotation dampening, especially of motorized vehicles.

2. Background Art

The beneficial effects of steering dampening of motor vehicles have been appreciated for many years. Steering dampers provide momentary resistance to jolts on the steering wheel, which are caused by bumps and obstacles in the path of the vehicle. They attenuate the physically exhausting effects of driving vehicles under rugged conditions.

U.S. Pat. No. 6,824,153 granted Nov. 30, 2004 to Hanawa Nobumichi

A steering device for a two-wheeler of the invention includes: a frame; a support member for a front wheel; a steering shaft connecting the support member to the frame so as to be rotatable about an axis thereof; and a rotary type steering damper providing a hydraulic resistance force in no matter which direction the support member rotates with respect to the frame. The steering damper has a vane adapted to swing in synchronism with rotation of the support member, oil chambers defined on both sides of the vane and filled with working fluid, a flow passage causing working fluid to flow from one oil chamber to the other oil chamber as the vane swings, and a damping valve arranged in a flow passage for the working fluid, and an opening of the damping valve is varied by a signal from outside to thereby generate a damping force optimized according to the travel condition.

U.S. Pat. No. 5,516,133 granted May 14, 1996 to D. L. Motrenec et al. for "Steering Stabilizer for Bicycles" discloses a device which dampens hydraulically. A valve in the hydraulic circuit controls the resistance to flow of hydraulic fluid and is remotely manually manipulated by a lever positioned near the hand grip on the handlebar. The valve provides three distinct levels of resistance.

The ability to adjust the dampening level of a steering mechanism is very useful. In terms of safety, control, and user fatigue, it is also ideal to establish zones of steering rotation, where the user may set a dampening level for turning, which is independent of the dampening level set for relatively straight-ahead driving. This invention provides infinite adjustability in specific zones of the vehicle's steering range, which are independent of each other, as well.

With existing dampers, the resistance level can be adjusted uniformly to suit particular conditions. However, no device allows the user to adjust the resistance for separate zones of steering rotation where a particular zone can be adjusted to have greater or lesser dampening then either of its adjacent sides.

SUMMARY OF THE INVENTION

It is the objective of this invention to provide a steering damper device which is capable of providing zone of steering rotation specific tunable steering dampening, allowing a user to adjust for: Personal preference, weather conditions, or course conditions. For example a particular user may prefer the relatively straight ahead steering zone to have a 20% higher dampening of rotation than the side steering zones used when turning. While in wet conditions the user may prefer the side steering zones have 50% lighter dampening than center to allow for quicker corrections to vehicle sliding.

In another situation the same or a different user may prefer the sides to have more dampening than the center if the turns of a particular course are rough.

BRIEF DESCRIPTION OF THE DRAWINGS

The invention is described in greater detail hereafter by reference to the accompanying drawings wherein.

DESCRIPTION OF THE PREFERRED EMBODIMENT

Figure 1:
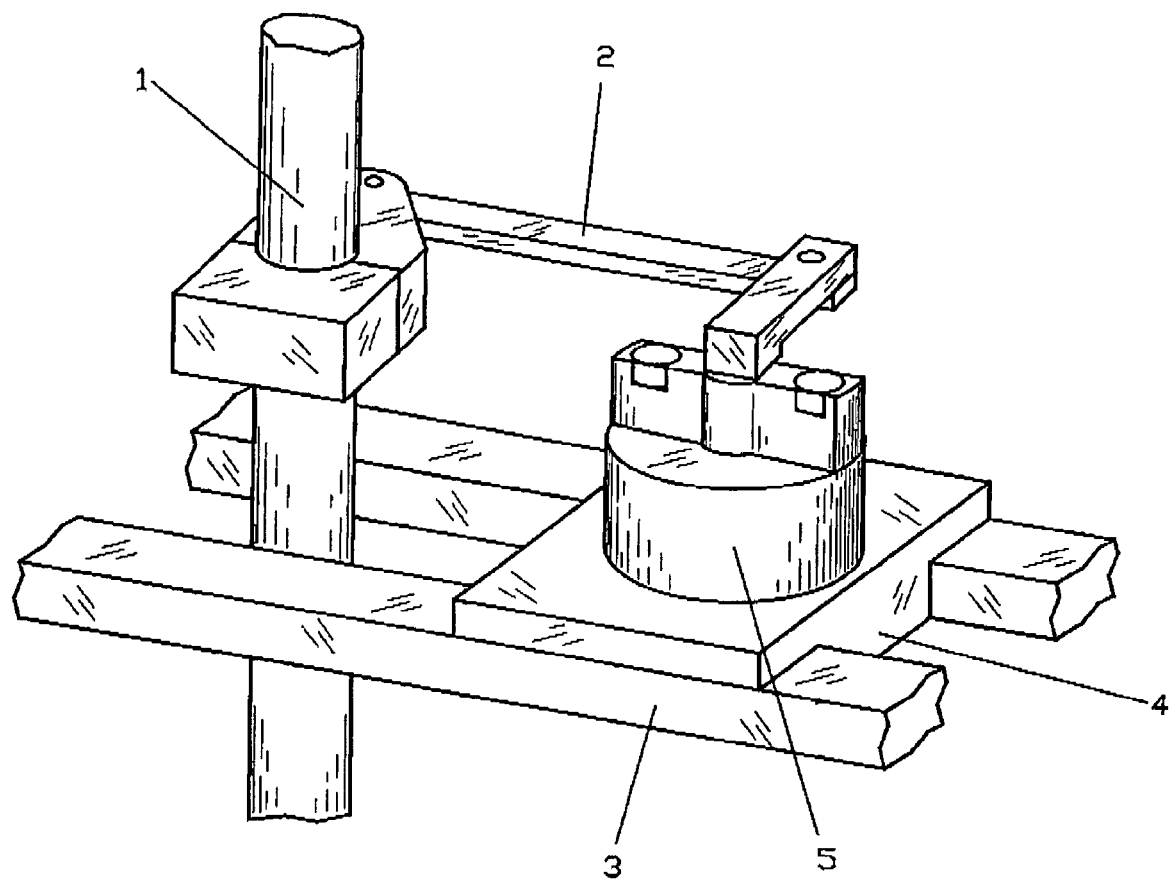
FIG. 1 is an assembled perspective view of a vehicle's steering system having the damper of this invention incorporated therein.
Figure 2:
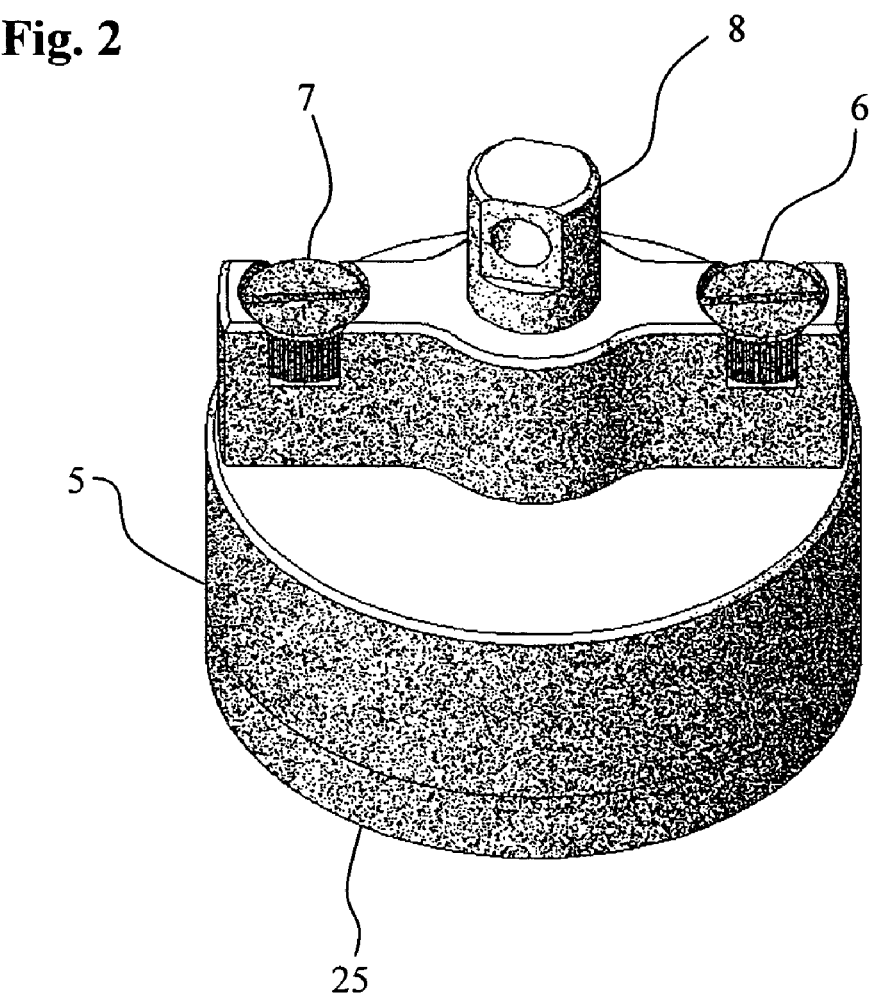
FIG. 2 is an isometric assembled view of the damper of this invention showing metering valve adjustment knobs.

Referring to FIG. 1 which illustrates the steering assembly of a vehicle wherein the reference numeral 1 designates the steering shaft of a vehicle that when rotated works the linkage 2 which correspondingly rotates the damper vane in synchronization with the vehicle steering shaft. The damper housing 5 is affixed to the vehicle's frame 3 by mounting hardware 4, thus creating relative motion between the steering shaft and vane in relation to the frame 3 and housing 5.

Figure 4:
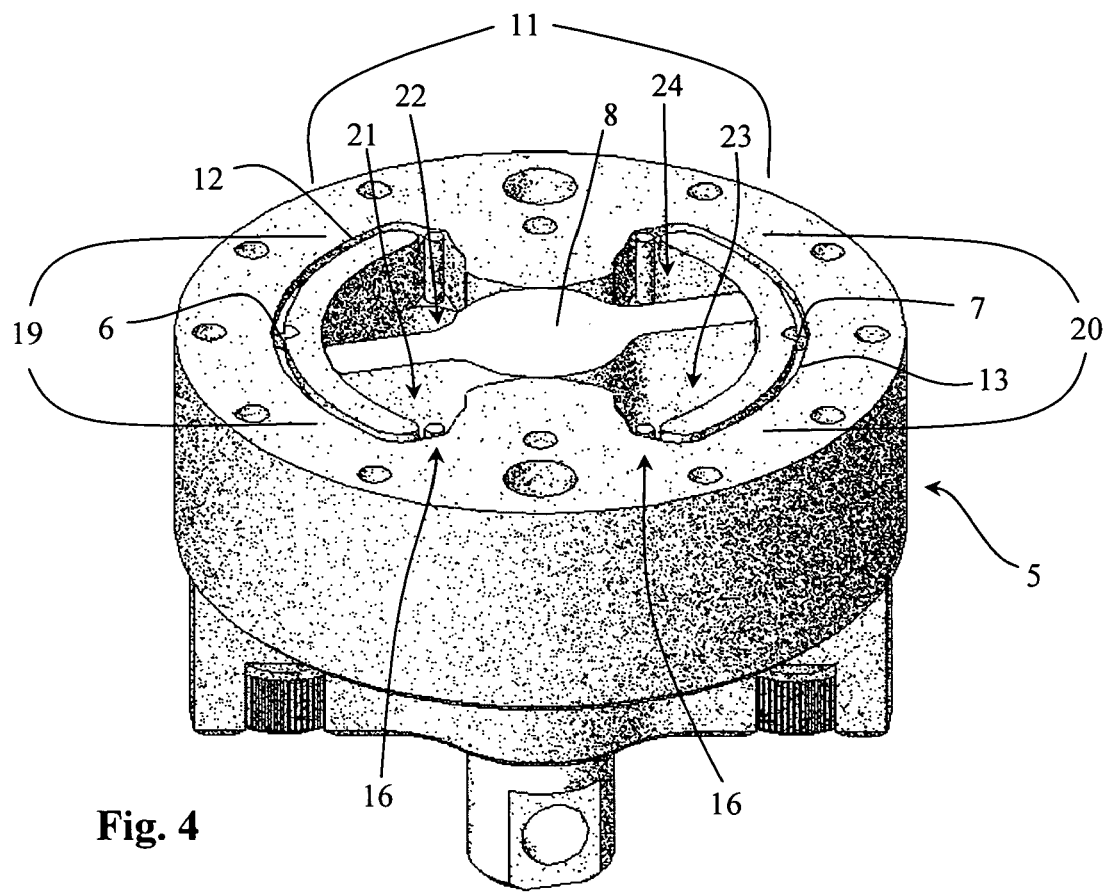
FIG. 4 is an isometric internal bottom view of the damper.

Energy that is caused by the front wheels impacting rough terrain or obstacles is transmitted to the steering wheel or bars through the steering shaft 1. The damper absorbs this energy, by the way of linkage 2 or direct mounting at the steering shaft 1, when the working fluid is directed by double sided vane 8 shown in FIG. 4 through pin valve 16 and the restricted flow passageways 12 and 13, thus creating higher pressures between the vane 8 and the housing 5. This pressure acts as a rotational force on the housing which is delivered to the frame of the vehicle 3 shown in FIG. 1 by the mounting hardware 4.

Figure 6:
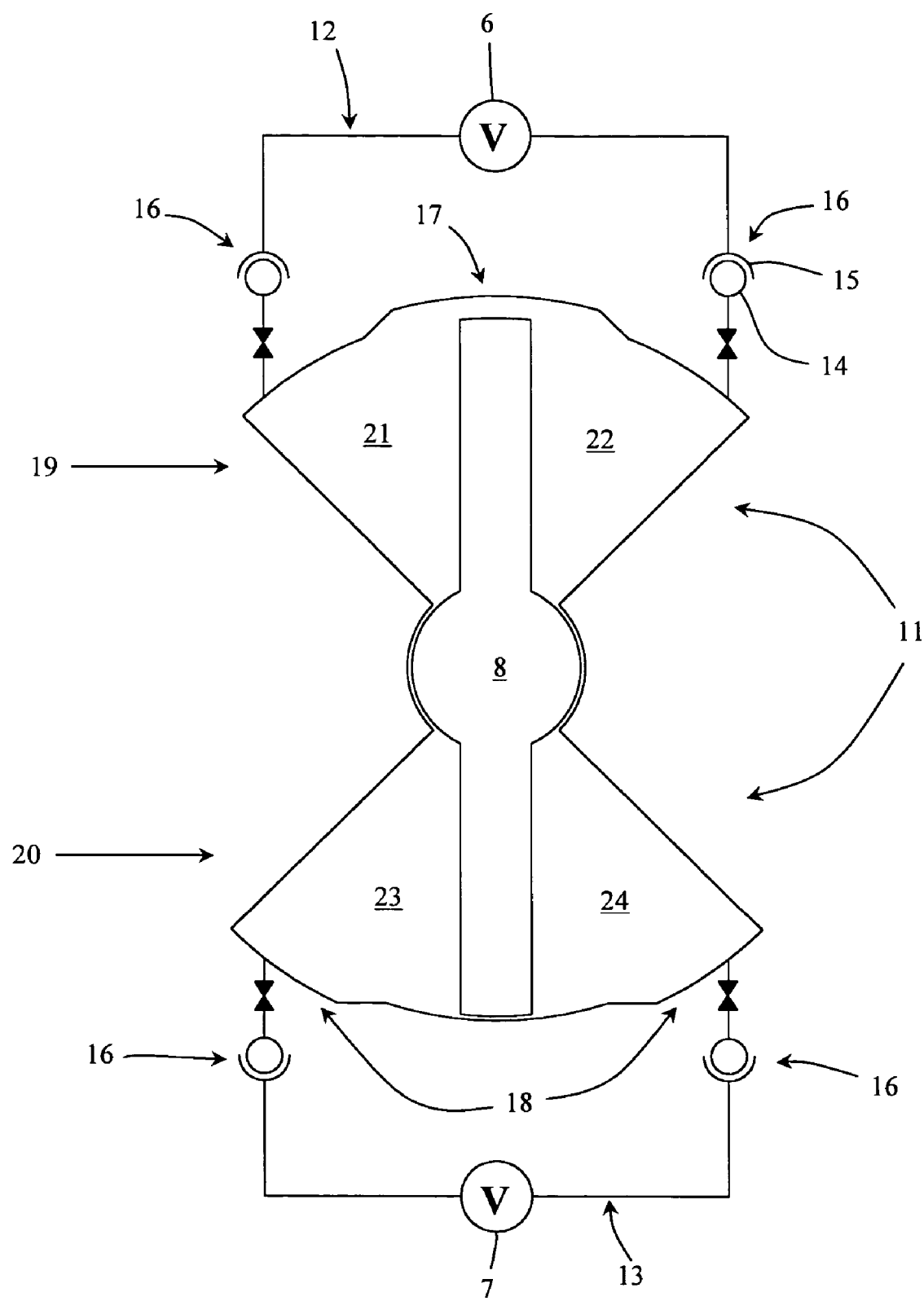
FIG. 6 is a schematic of the fluid circuits and flow paths of the damper.

The working fluid is contained by master chamber 11 shown in FIG. 6. The master chamber is divided into circuit chambers 19 and 20 by the cylindrical portion of vane 8 the double sided vane 8 subdivide the circuit chambers into four sub chambers 21, 22, 23 and 24. These components are sealed by cover 25 shown in FIG. 3

Figure 3:
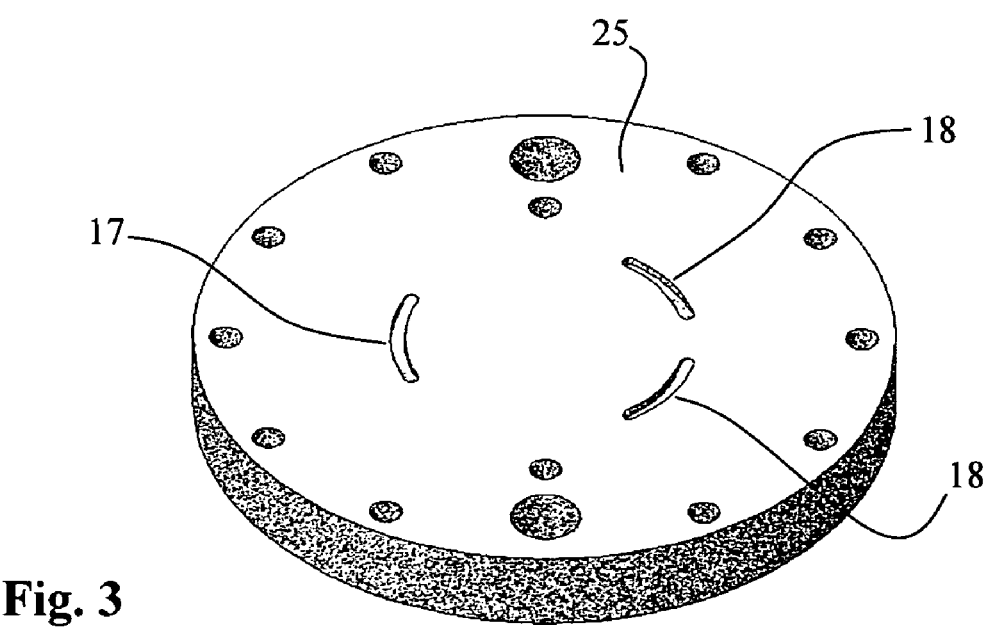
FIG. 3 is an isometric view of the inside surface of the housing cover component of FIG. 2.

The working fluid is moved from each side of the double side vane 8 shown in FIG. 3 to the other side of the same vane by the rotation of the vehicle's steering shaft 1 shown in FIG. 1 which works the linkage 2 that rotates the vanes 8 about its axis. The fluid, preferably hydraulic oil, is directed through valves 16 shown in FIG. 4 where it is further restricted in proportion to the pressure generated in the sub chamber, the working fluid travels through flow passageway 12 and 13 where it is metered by valves 6 and 7 before reaching the adjacent sub chamber.

Figure 5:
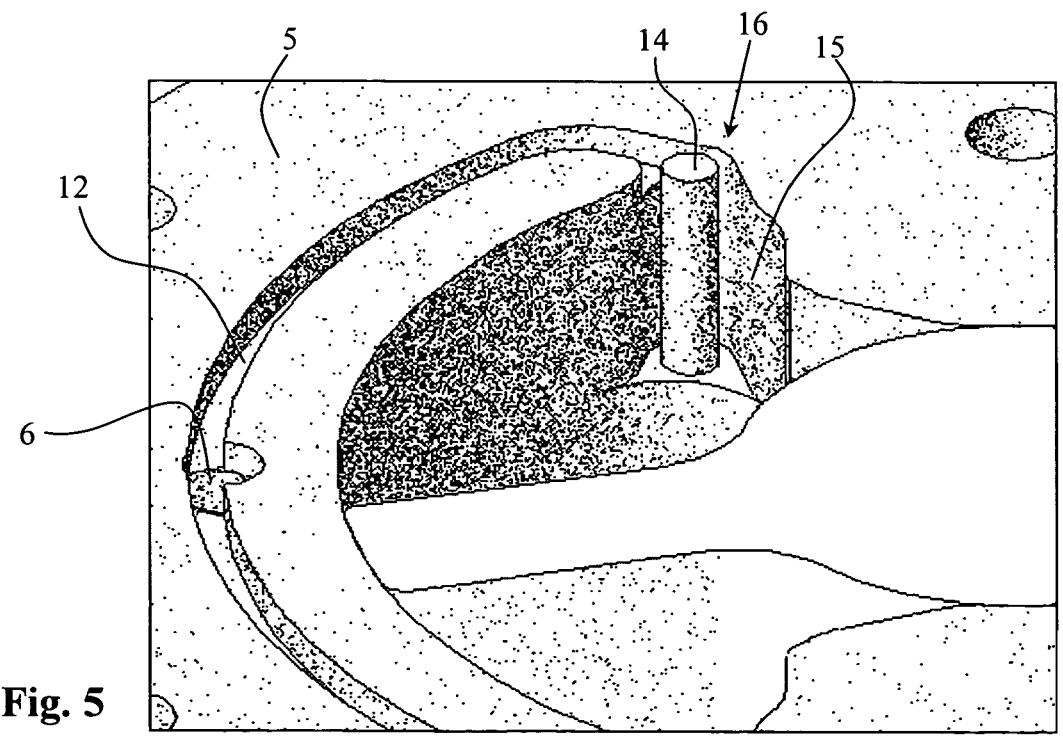
FIG. 5 is an isometric view of a portion of the damper showing the pin valve in one of the hydraulic circuits of a chamber.

A pin valve 16 shown in FIG. 5 increases the dampening. A pocket 15 with close clearance to rod 14 which has a length to pin diameter ratio that allows the pin to yield the distance needed to further restrict the flow though the flow passageway 12 when the pressure in the pin's sub chamber exceeds the pins resistance to bend. The pin valve's characteristics can be altered by changing the pin's diameters, lengths, material, proximity to the flow passageway 12, side clearance to pocket 15, or the viscosity of the working fluid. The rod 14 can be press fitted into the housing 5 or be threaded in to a close clearance hole allowing adjustability of high pressure dampening.

Dampening of rotation in normal steering is a desired effect. It is the objective of this invention to allow the ability to adjust the dampening of rotation in different zones of rotation in the vehicle's steering range. The dampening that is observed at the steering wheel or handlebar is adjusted with metering valves 6 and 7 shown in FIG. 6. The opening or closing of said valves restricts flow through the fluid passageways 12 and 13 respectively. Zones of steering rotation dampening are also adjusted by said metering valves. The pressure relief grooves in FIG. 6 are one example of steering zone creation where pressure relief groove 17 lessens the dampening effect in the center of the vehicle's steering rotation, while grooves 18 conversely lessen the dampening effect on the sides, or while the vehicle is turning. In this case, the adjustment of metering valve 6 will have a much greater affect on the dampening while turning a vehicle, while adjusting metering valve 7 will more greatly affect dampening in the center portion of the steering rotation, when the vehicle is going relatively straight ahead, by opening valve 6 some amount and closing valve 7, this will create higher resistance to rotation in the center of the vehicle's steering range and less resistance at the sides when turning. Conversely closing valve 6 and opening valve 7 will create the opposite effect, a less dampened center of vehicle's steering rotation and increased dampening when turning.

By using a four chamber system of an accurate master chamber that is divided into two circuit chambers by a cylinder which in turn has two opposing vanes that sub-divide the circuit chambers into four sub chambers, these chambers contain a working fluid that is displaced by the rotation of a cylindrical shaft and attached vanes working in synchronism with the steering mechanism of a vehicle. The working fluid is directed from one side of each vane to the other through the narrow metered and/or valved passageways creating dampening.

Further, strategically placed grooves that relieve dampening pressures caused by the restricted rotation of the vanes can enhance the dampening effect. The pressure relief grooves can be symmetrical with respect to each sub chamber of a single circuit chamber causing an equivalent steering restriction when turning from center to right or from center to left. The grooves can alternatively be non symmetrical creating a completely different steering feel when turned in the same manners.

The second circuit chamber allows for unique relief grooves in comparison to the first circuit chamber, where these grooves can be placed in an apposing position in relation to the first circuit chamber those allowing for more or less dampening in the same area and direction of rotation by adjusting one or the other metering valves. As another alternative the second circuit chamber could be without any pressure relief grooves creating a smooth and even dampening in the second circuit, while the first circuit maintains its altered dampening characteristics.

Pressure relief grooves of changing area, from the perspective of the vane passing over it, create a smooth transition in dampening resistance, when these grooves are in diametrically opposing sub chambers and the first groove having an increasing area while the opposing groove having a decreasing area, both from the perspective of the rotating vanes, enables this invention to have a tunable dampening where partially closing the first metering valve would have a increase in dampening while steering though a particular zone of rotation. Conversely partially closing the second valve rather than the first would have the opposite effect on the steering through the same zone in the same direction of rotation.

What is claimed is:

1. A vehicle steering damper comprising:
    a master chamber filled with working fluid, said master chamber is divided into a first circuit chamber and a second circuit chamber by a cylindrical shaft;
    said cylindrical shaft possesses a first vane in said first circuit chamber, which divides said first circuit chamber into a first set of sub-chambers;
    wherein said first vane, moving in synchronized motion with a vehicle steering mechanism, directs said working fluid to pass from one sub-chamber of said first circuit chamber to the other sub-chamber of said first circuit chamber, through a first narrow passageway, creating minor damping pressure, and a first metering valve further restricts flow through said first narrow passageway;
    and, wherein at least one internal surface of said first set of sub-chambers has a first set of at least one pressure relieving recesses with adequate width and depth to permit passage of said working fluid past said first vane, to greatly reduce damping pressure when there is movement of said first vane along said first set of pressure relieving recesses;
    a second vane in said second circuit chamber, which divides said second circuit chamber into a second set of sub-chambers;
    wherein said second vane, moving in synchronized motion with said vehicle steering mechanism, directs said working fluid to pass from one sub-chamber of said second circuit chamber to the other sub-chamber of said second circuit chamber, through a second narrow passageway, creating minor damping pressure, and a second metering valve further restricts flow through said second narrow passageway;
    and, wherein at least one internal surface of said second set of sub-chambers has a second set of one or more pressure relieving recesses with adequate width and depth to permit passage of said working fluid past said second vane, to greatly reduce damping pressure when there is movement of said second vane along said second set of pressure relieving recesses;
    the first set of pressure relieving recesses are arranged with respect to the second set of pressure relieving recesses
    so that said second vane, during steering rotation, enters a second sector of recesses containing the second set of recesses as said first vane enters a first non-recessed sector not containing the first set of recesses, allowing said first metering valve to be the dominant control of damping while said first vane is operating in said first non-recessed sector, thus creating a first zone of adjustably dampened steering that is controlled in said first circuit chamber;
    and, so that said first vane, during steering rotation, enters a first sector of recesses containing the first set of recesses as said second vane enters a second non-recessed sector not containing the second set of recesses, allowing said second metering valve to be the dominant control of damping while said second vane is operating in said second non-recessed sector, thus creating a second zone of adjustably dampened steering that is controlled in said second circuit chamber, which is independent of said first zone of adjustably dampened steering that is controlled in said first circuit chamber.

* * * * *